United States Patent
Wobben (10) Patent No.: US 6,946,750 B2
(45) Date of Patent: Sep. 20, 2005

(54) WIND POWER PLANT HAVING A POWER GENERATION REDUNDANCY SYSTEM

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 10/344,481
(22) PCT Filed: Aug. 10, 2001
(86) PCT No.: PCT/EP01/09239

§ 371 (c)(1),
(2), (4) Date: Jun. 10, 2003

(87) PCT Pub. No.: WO02/15367

PCT Pub. Date: Feb. 21, 2002

(65) Prior Publication Data

US 2004/0100102 A1 May 27, 2004

(30) Foreign Application Priority Data

Aug. 14, 2000 (DE) .......................... 100 40 273

(51) Int. Cl.⁷ .............................. F03B 13/10; H02P 9/04
(52) U.S. Cl. .............................. 290/44; 290/55; 322/89; 322/90
(58) Field of Search .............................. 322/89, 90, 14, 322/15, 28; 290/44, 55

(56) References Cited

U.S. PATENT DOCUMENTS

| | | | |
|---|---|---|---|
| 4,318,019 A | 3/1982 | Teasley et al. | |
| 4,550,267 A | 10/1985 | Vaidya | |
| 5,418,446 A | * 5/1995 | Hallidy | ........................ 322/28 |
| 5,783,894 A | 7/1998 | Wither | |

FOREIGN PATENT DOCUMENTS

| | | |
|---|---|---|
| CA | 2215971 | 9/1996 |
| DE | 42 32 356 A1 | 3/1994 |
| DE | 196 20 906 A1 | 1/1998 |
| EP | 0 884 883 A1 | 12/1998 |
| JP | 2000-116194 | 4/2000 |
| JP | 2002-507878 | 3/2002 |
| RU | 2105405 | 2/1998 |
| WO | WO 88/07782 | 10/1988 |
| WO | WO 97/45908 | 12/1997 |
| WO | WO 99/48187 | 9/1999 |

* cited by examiner

Primary Examiner—Darren Schuberg
Assistant Examiner—Heba Y. Elkassabgi
(74) Attorney, Agent, or Firm—Neil A. Steinberg (57) ABSTRACT

A wind power installation having external and/or internal redundancy derived by multiple, independent power generating systems arranged in parallel, but switchably interconnected to allow substantial continued operation in the event of a critical component failure.

42 Claims, 8 Drawing Sheets

WIND POWER PLANT HAVING A POWER GENERATION REDUNDANCY SYSTEM

BACKGROUND OF THE INVENTION

The present invention concerns a wind power installation with preferably at least rectifiers and two inverters.

Such a wind power installation is known from patent specification DE 196 20 906.4. A disadvantage with that wind power installation however is that, in the event of failure of the generator and/or the transformer, the wind power installation can no longer generate or deliver any electrical power. In the event of failure of a rectifier and/or an inverter it is still approximately half of the possible power yield that is lost at any event, so that rapid repair is required in order to limit at least the economic damage to the operator of the installation due to the energy yield which is lost.

That known wind power installation has two phase-displaced stator windings which are arranged jointly on the same stator. The windings however are electrically insulated from each other and have a phase angle of 30° relative to each other. In the event of failure of a stator winding therefore half of the possible output power is still available.

In order to eliminate the fault and to repair the wind power installation service personnel travel to the faulty wind power installation and deal with the fault, either by a repair to the faulty or damaged components or, if repair is not possible, by replacing the defective components by a replacement part.

It will be noted that rapid repair presupposes inter alia that the wind power installation is quick to reach and if necessary spare parts can be quickly brought to the installation.

If it can still be assumed that wind power installations which are set up on land can be quickly reached in that way, the situation is already markedly different in relation to off-shore installations, that is to say wind power installations which are set up off the coast and thus at sea. On the one hand a suitable transport means must be available, with which possibly even large-volume and/or heavy spare parts can be transported and handled, while on the other hand the weather and the state of the sea must allow the installation to be safely reached, even with the loaded spare parts. Even if it is possible to reach the installation however, it is in no way certain in that respect that the sea swell and the weather will permit immediate repair.

It will be seen therefore that, if the swell is high or if the weather is bad, such as for example if there is a storm, it is definitely not possible to reach or repair off-shore installations, for a relatively long period of time, and therefore the off-shore installations cannot generate or deliver power for a prolonged period of time.

A further disadvantage with the previously known wind power installation, as also all others, is that the concept on which that wind power installation is based means that the dimensions and the inherent weight of the individual components become greater, with an increasing generator output.

SUMMARY OF THE INVENTION

In order to limit the damage due to the failure of components of a wind power installation and to allow the use of standard components, in accordance with the invention there is proposed a wind power installation of the kind set forth in the opening part of this specification, having at least two stators each with at least one stator winding, and at least two transformers. Advantageous developments are described in the further claims.

Accordingly the wind power installation according to the invention has at least two stators, two rectifiers, two inverters and two transformers. They respectively form, starting from the stator, a specific and complete system for the production of electrical energy, for conversion into for example a sinusoidal ac voltage and for feeding into an ac voltage network.

A preferred embodiment of the invention has four stators which are arranged in the form of a circular ring and which are in the shape of circular ring segments and which each have at least one winding of their own. As a result, the dimensions and the inherent weight of each stator remain in a range in which transportation and handling of the stator can be implemented with the usual available aids.

In a preferred development of the wind power installation according to the invention each stator has two three-phase current windings which are electrically separated from each other and which are displaced relative to each other at a phase angle of 30°. By virtue of that measure a part of the exciter current for the rotor can be produced in the stator winding.

In a particularly preferred development of the invention a rectifier, an inverter and a transformer are associated with each stator. That arrangement affords four separate power production systems, apart from the common rotor. Accordingly each system produces a quarter of the possible total output power. It follows therefrom that, in the event of failure of a component, only one system fails, and therewith just a quarter of the instantaneous overall output power. Accordingly therefore three quarters of the output power are still available.

If a total output power of 6 MW is considered for a wind power installation, each system accordingly involves an output power of 1.5 MW. That output power makes it possible to use standard components which are already available and produced in large numbers nowadays, as rectifiers, inverters and transformers. As a result the probability of failure is markedly reduced due to the use of technically matured components which are produced in large numbers, and that in turn contributes to a permanently high level of yield from a wind power installation according to the invention.

In accordance with a preferred embodiment of the invention a rectifier, an inverter and a transformer are associated with each stator winding. A power production system is accordingly formed from a stator winding, a rectifier, an inverter and a transformer. That design configuration means that each of the systems is only involved with an eighth of the instantaneously available output power. Therefore, in the event of failure of a component and thus a system, only an eighth of the available power is no longer available, but seven eighths are still available.

In addition this concept in turn permits production of an even higher number of standard components and thus a reduction in cost. In addition transportation and handling means, procedures and methods are available for those components and have been tried out in many situations.

In a particularly preferred embodiment of the invention the rectifiers, the inverters and the transformers are designed to be over-dimensioned, preferably by about 20%, and provided between each two rectifiers, between each two inverters and between each two transformers are switch devices which in the event of failure of a component permit it to be by-passed.

Due to the over-dimensioning the remaining components can at least temporarily take over the function of the failed component without that causing an overloading to occur. If therefore for example a rectifier fails the switch devices between the failed rectifier and one or more adjacent operational rectifiers can be actuated. In that way the operational rectifiers are acted upon with a correspondingly higher output power and also rectify the ac voltage from the system with the failed rectifier.

In a particularly preferred feature control of the switch devices is effected having regard to the output power to be switched, so that only one switch device switches when the level of output power is low. If the output power to be switched is higher a plurality of switch devices are actuated in order thereby to distribute the loading to a plurality of components and to avoid overloading.

In a particularly preferred development of the invention switch devices are provided in the feed line and/or the out line of each component with the exception of the stators. By actuation of the corresponding switch devices it is possible to reliably avoid any reaction on the part of the component to be by-passed if that component is completely disconnected by the switch devices.

In an alternative embodiment of the invention the feed lines and out lines of the individual components are connected in parallel. That saves on switch devices, in the event of failure of a component all the other components are always automatically operated and the control system is simplified as it is only the failed component that has to be disconnected by switch devices in the feed lines and/or out lines.

The redundancy of the individual components is referred to as 'external redundancy' and identifies the possibility, in the event of failure of a component, of causing the function thereof to be taken over by a redundantly present, other component. In the event of failure of a rectifier therefore other rectifiers take over the function, in the event of failure of an inverter other inverters take over the function and in the event of failure of a transformer other transformers take over the function.

In comparison there is also internal redundancy. That denotes constructing a component with a plurality of modules which are present redundantly with each other and which relative to the exterior form a component such as for example an inverter. Therefore in the event of failure of one of a plurality of modules of an inverter that inverter can definitely still remain operational as the remaining modules of the inverter can still continue to implement the function involved.

Accordingly a stator with two windings also has internal redundancy as, in the event of failure of one winding, the second winding is still available for generating power so that the stator can still deliver half of the possible output power.

Accordingly the wind power installation according to the invention can deliver all of the instantaneously available output power even in the event of failure of individual components or modules, with the exception of a stator or a stator winding.

Further advantageous developments of the invention are described in the appendant claims.

BRIEF DESCRIPTION OF THE DRAWINGS

An embodiment of the invention is described in greater detail hereinafter by means of an example. In the drawings.

DETAILED DESCRIPTION

Figure 8:
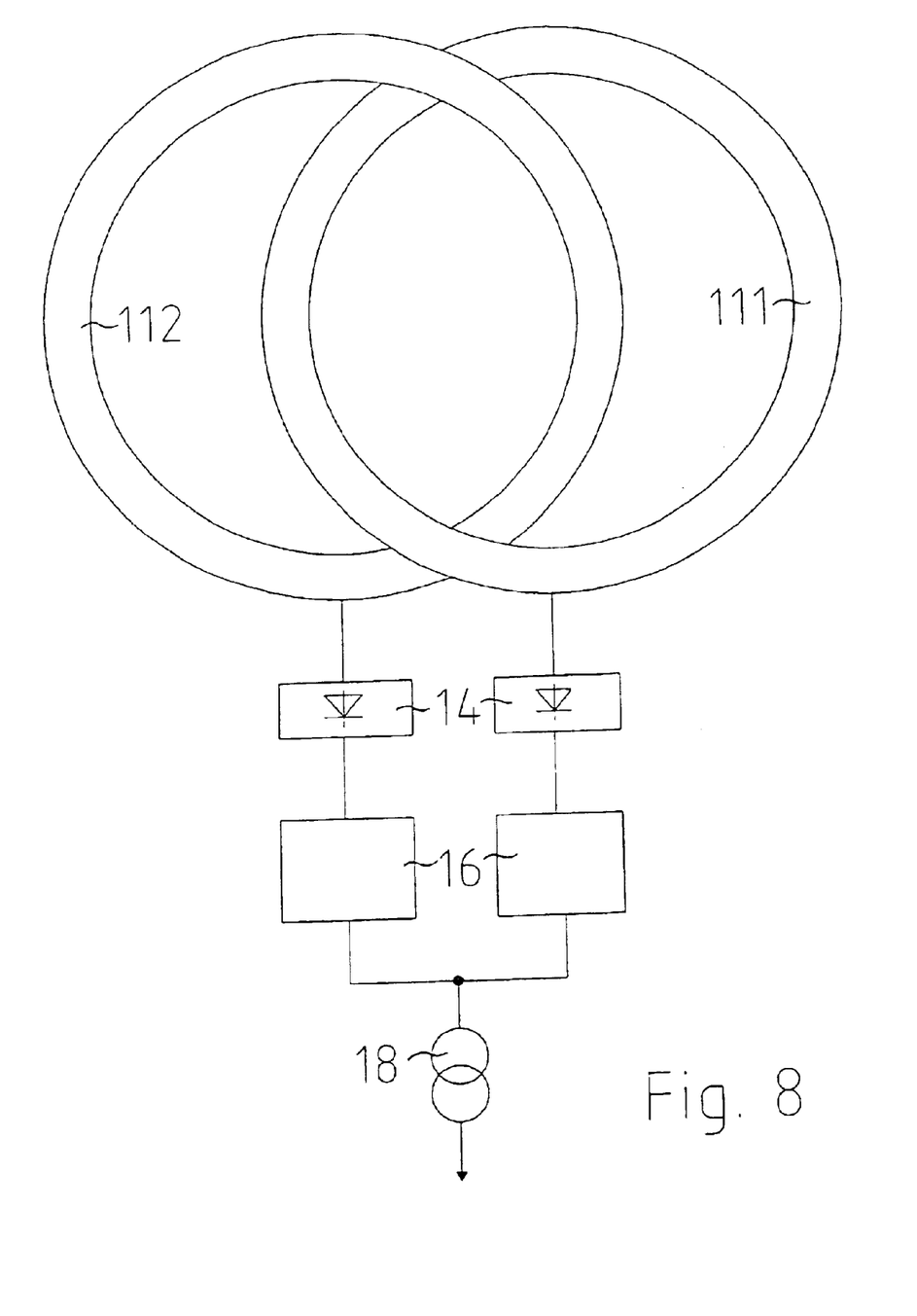
FIG. 8 shows a known system.

FIG. 8 shows a known electrical system of a wind power installation. That electrical system includes a generator which in this example is in the form of a ring generator. The ring generator has a rotor (not shown) and two stator windings 111, 112 which are electrically insulated from each other and which are phase-displaced through 30° relative to each other.

The stator windings 111, 112 are each connected to the input of a respective rectifier 14 specific thereto. The output of each rectifier 14 is connected to an input of a respective inverter 16. The outputs of the inverters 16 are connected in parallel to a transformer 18.

Just the failure of the transformer 18 inevitably results in economic total failure of the wind power installation as it is not possible for any further energy to be delivered. As a result the operator suffers from considerable loss, depending on the respective duration of the failure.

The failure of a stator winding 111, 112, a rectifier 14 and/or an inverter 16 also in any case results in a loss of half the possible energy yield and thus also results in considerable economic damage.

Figure 1:
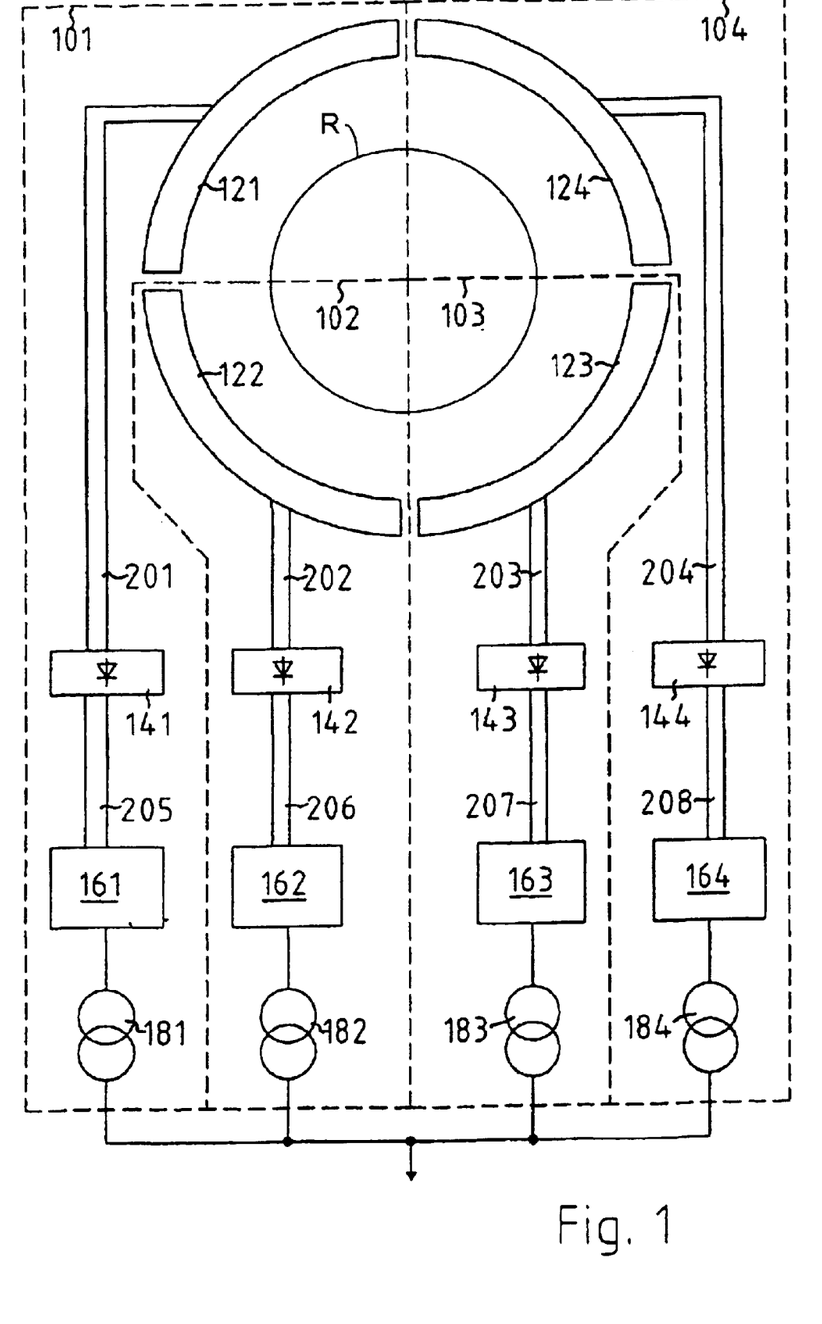
FIG. 1 shows a simplified view of a system according to the invention.

FIG. 1 shows a simplified example of a wind power installation according to the invention. Most components are redundantly present in this wind power installation. Such redundancy concerns parts of the generator, namely stators 121, 122, 123, 124, rectifiers 141, 142, 143, 144, inverters 161, 162, 163, 164 and transformers 181, 182, 183, 184.

That redundancy which arises out of a parallel arrangement of the redundant components is external redundancy. In addition with some components there is also internal redundancy which arises out of the internal structure of the component being made up of a plurality of similar modules connected in parallel. That internal redundancy is to be found for example in the case of the inverters which are described in greater detail with reference to FIG. 4.

For the purposes of the description hereinafter, in a similar manner to the foregoing way of considering matters, each element 121, 122, 123, 124 which is in the form of a segment of a circular ring and which has at least one winding in which a voltage is induced by the rotating rotor R is referred to as a stator even if there are four elements 121, 122, 123, 124 which are in the form of a segment of a circular ring and they are arranged in such a way that together they approximately form the shape of a one-piece stator of a ring generator, as in the case of the present embodiment.

The stators 121, 122, 123, 124 which are arranged in the form of a circular ring and which are in the shape of segments of a circular ring together approximately form a circular ring in which the rotor (not shown) of the generator is centrally rotated by the wind power installation rotor hub (not shown) with the rotor blades fixed thereto. As the individual stators 121, 122, 123, 124 are separated from each other not only mechanically but also electrically, voltages are correspondingly induced in the windings on the stators 121, 122, 123, 124.

Those voltages are ac voltages which are passed through conductors 201, 202, 203, 204 to rectifiers 141, 142, 143, 144. Those conductors 201, 202, 203, 204 can be for example aluminium bars with a cross-sectional area of 4,000 mm². In that respect a separate rectifier is associated with each stator 121, 122, 123, 124. It follows therefrom that, even if a rectifier fails, only a quarter of the possible energy yield is no longer available. Accordingly three quarters of the possible output power is still available.

Connected on the output side of each rectifier 141, 142, 143, 144 is an inverter 161, 162, 163, 164 and also connected thereto by a conductor 205, 206, 207, 208. Those conductors 205, 206, 207, 208 can also be aluminium bars of a cross-sectional area of 4,000 mm².

Connected on the output side of each inverter 161, 162, 163, 164 there is again a transformer 181, 182, 183, 184 by way of which the ac voltage generated by the inverters 161, 162, 163, 164 is stepped up to for example 20 kV and fed for example into a medium-voltage network.

In that way, starting from the stator windings in which the voltage is induced by the generator rotor, there are mutually independent systems 101, 102, 103, 104 with rectifiers 141, 142, 143, 144, inverters 161, 162, 163, 164 and transformers 181, 182, 183, 184 so that a failure of a component prevents at most the provision of a quarter of the possible output power.

Figure 2:
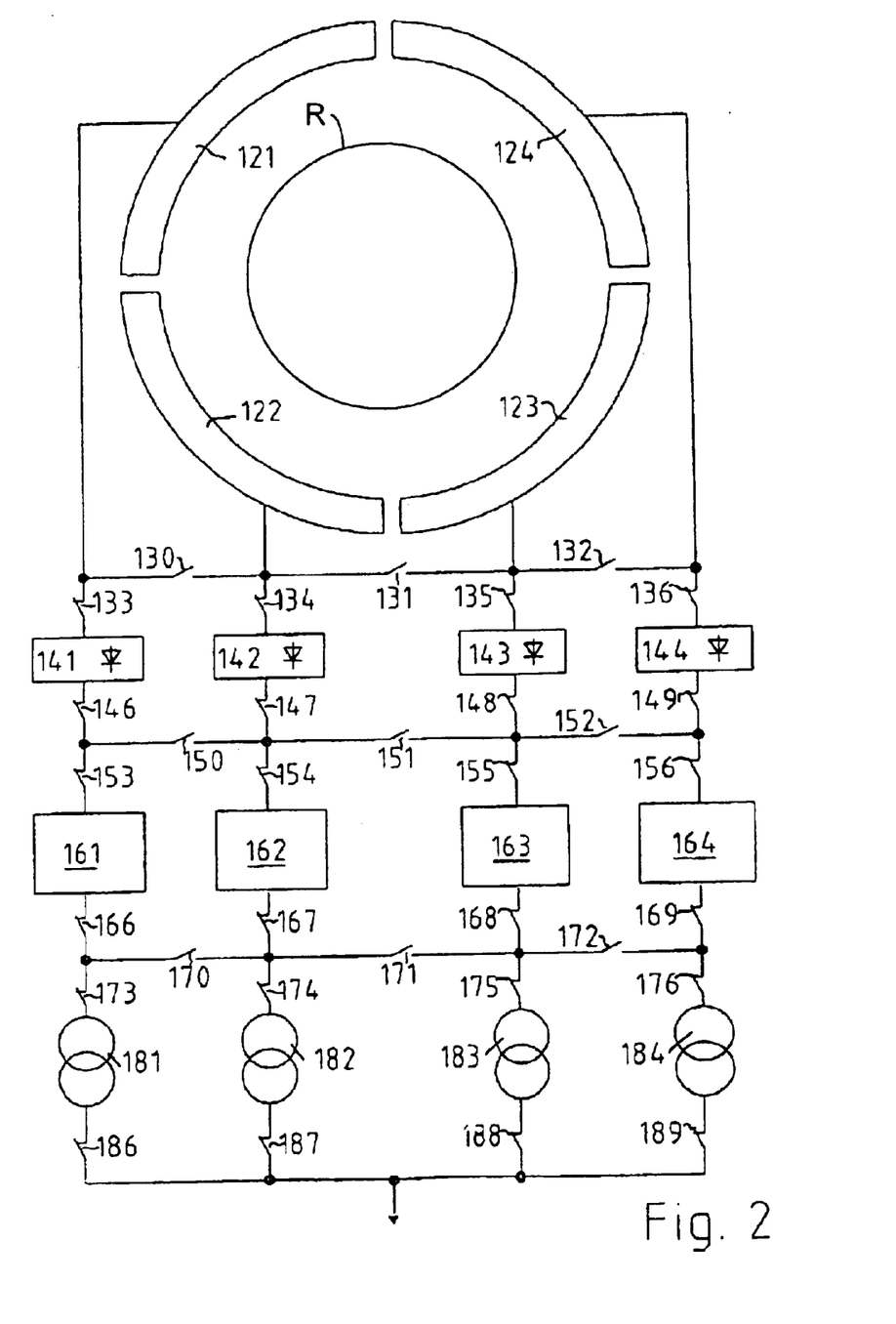
FIG. 2 shows a view, supplemented by switch devices, of the system illustrated in FIG. 1.

FIG. 2 is expanded in comparison with FIG. 1 by switch devices 130, 131, 132, 133, 134, 135, 136, 146, 147, 148, 149, 150, 151, 152, 153, 154, 155, 156, 166, 167, 168, 169, 170, 171, 172, 173, 174, 175, 176, 186, 187, 188, 189. These are referred to hereinafter in their totality by reference numerals 130–136, 146–156, 166–176 and 186–189. In order to retain clarity of the Figure, the references for the conductors between the stators 121, 122, 123, 124, the rectifiers 141, 142, 143, 144 and the inverters 161, 162, 163, 164 and the markings of the systems 101, 102, 103, 104 have been omitted here.

In normal operation the switch devices 130, 131, 132, 150, 151, 152, 170, 171, 172 between the feed lines of the individual components are open and the switch devices 133, 134, 135, 136, 146, 147, 148, 149, 153, 154, 155, 156, 166, 167, 168, 169, 173, 174, 175, 176, 186, 187, 188, 189 in the feed lines and outlines in series with the respective components are closed in normal operation so that each system 101, 102, 103, 104 (FIG. 1) operates separately from the others.

The switch devices 130–136, 146–156, 166–176, 186–189 are now controllable in such a way that they make connections between individual components of at least two systems 101, 102, 103, 104. Those connections are made in such a way that the feed lines of two similar components are always connected parallel by each switch device 130, 131, 132, 150, 151, 152, 170, 171, 172.

For example the feed lines of the rectifiers 141 and 142 are connected in parallel by actuation of the switch device 130, the inputs of the inverters 161 and 162 by actuation of the switch device 150 and the inputs of the inverters 162 and 163 by actuation of the switch device 151. It will be appreciated that combinations in that respect are also possible.

In order to avoid a reaction of failed or faulty components on those which are still operational, provided in the feed lines and out lines of the individual components are switch devices 133, 146; 134, 147; 135, 148; 136, 149; 153, 166; 154, 167; 155, 168; 156, 169; 173, 186; 174, 187; 175, 188; 176, 189 which preferably disconnect the respective component, with all lines.

In the case of a fault in a component therefore that component is by-passed by suitable actuation of the switch devices 130–136, 146–156, 166–176 and 186–189 so that, in spite of the fault, the wind power installation still delivers the major part of the power generated or even all the power generated.

In order to prevent overloading of the intact components which have remained, and thus to prevent premature failure thereof, those components are preferably over-dimensioned by about 20% so that even when those remaining components are loaded with the output power of a failed component, that does not cause any overloading.

The switch devices 130–136, 146–156, 166–176 and 186–189 are in this case so arranged and are controlled in such a manner that admittedly it is possible to by-pass a component such as for example a rectifier 141, 142, 143, 144 or an inverter 161, 162, 163, 164, but it is not possible to skip over a function implemented by such components.

In the event of a failure for example of the inverter 162 the normally open switch devices 150, 151, 152 can be closed in order to connect the rest of the inverters 161, 163, 164 to the feed line of the inverter 162. At the same time the normally closed switch devices 154, 167 are actuated and thereby opened in order to disconnect the failed inverter 162.

Finally the normally opened switch devices 170, 171, 172 can be actuated and thus closed so that the three inverters 161, 163, 164 again act on all four transformers 181, 182, 183, 184.

In that way the failed inverter 162 is by-passed and, in spite of the failure of the inverter 162, the wind power installation can deliver all the available power produced.

Figure 3:
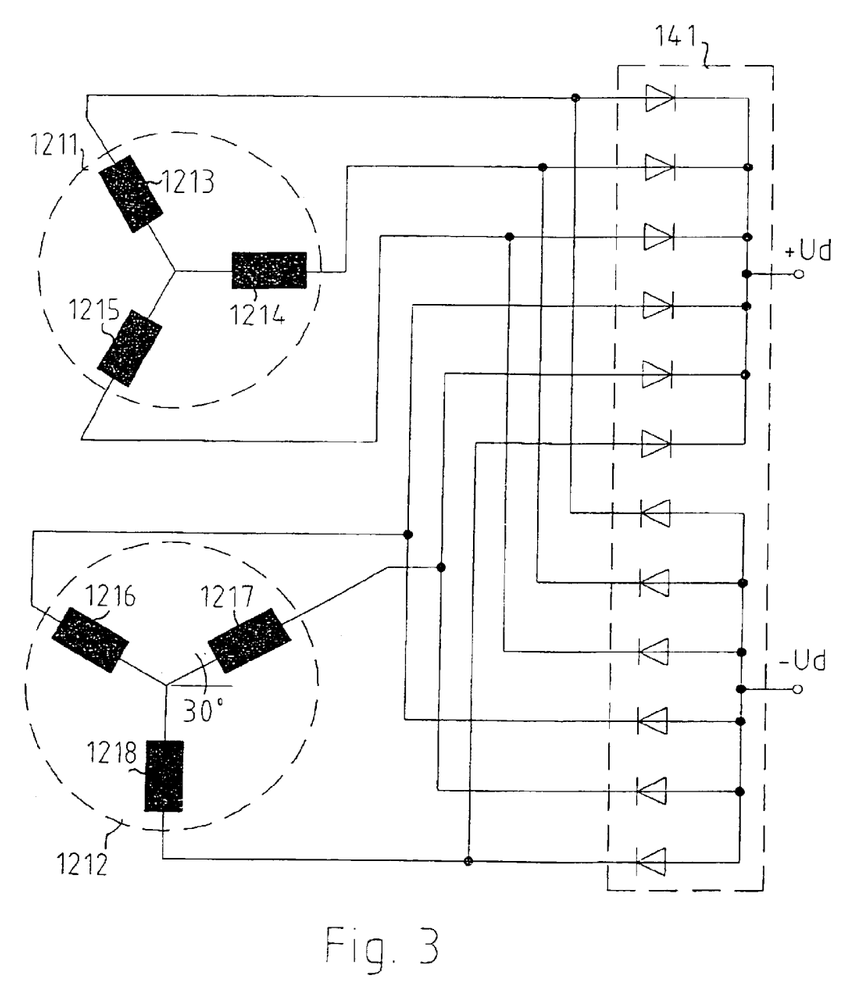
FIG. 3 shows an example of two stator windings displaced through 30°, with a rectifier connected on the output side thereof.

FIG. 3 shows a particularly preferred embodiment of the stator windings and the rectifier connected downstream thereof, using the example of the system 101. The stator windings 1211 and 1212 with the downstream-connected rectifier 141 are described here. This arrangement which is described by way of example is identical to that of the other redundant systems 102, 103, 104.

The stator 121 which is not shown in FIG. 3 carries two stator windings 1211, 1212 which are displaced through 30° relative to each other. Both stator windings 1211, 1212 are in the form of three-phase current windings and thus each have three phase windings 1213, 1214, 1215 and 1216, 1217, 1218. That total of six phase windings 1213, 1214, 1215, 1216, 1217, 1218 are connected to a six-phase rectifier 141.

The phase angle between the individual phases 1213, 1214, 1215 and 1216, 1217, 1218 of a winding is 120°. If a rotor (not shown) is assumed to be rotating in the clockwise direction, then the phases of the voltages induced in the winding 1211 trail the phases of the voltages induced in the winding 1212, by 30°. As the phases of a winding are displaced relative to each other through 120°, for example the voltage in the phase 1214 in the winding 1211 trails the voltage in the phase 1217 in the winding 1212 by 30°, but leads the phase 1218 in the winding 1212 by 90°. In that way a part of the exciter power required for the phase 1218 can be produced in the phase 1214.

As both three-phase current windings 1211, 1212 are arranged on a stator 121, an internal redundancy is already embodied here so that, upon failure of a winding 1211, 1212, the other winding 1212, 1211 can always still produce output power which is then passed to the rectifier 141.

Figure 4:
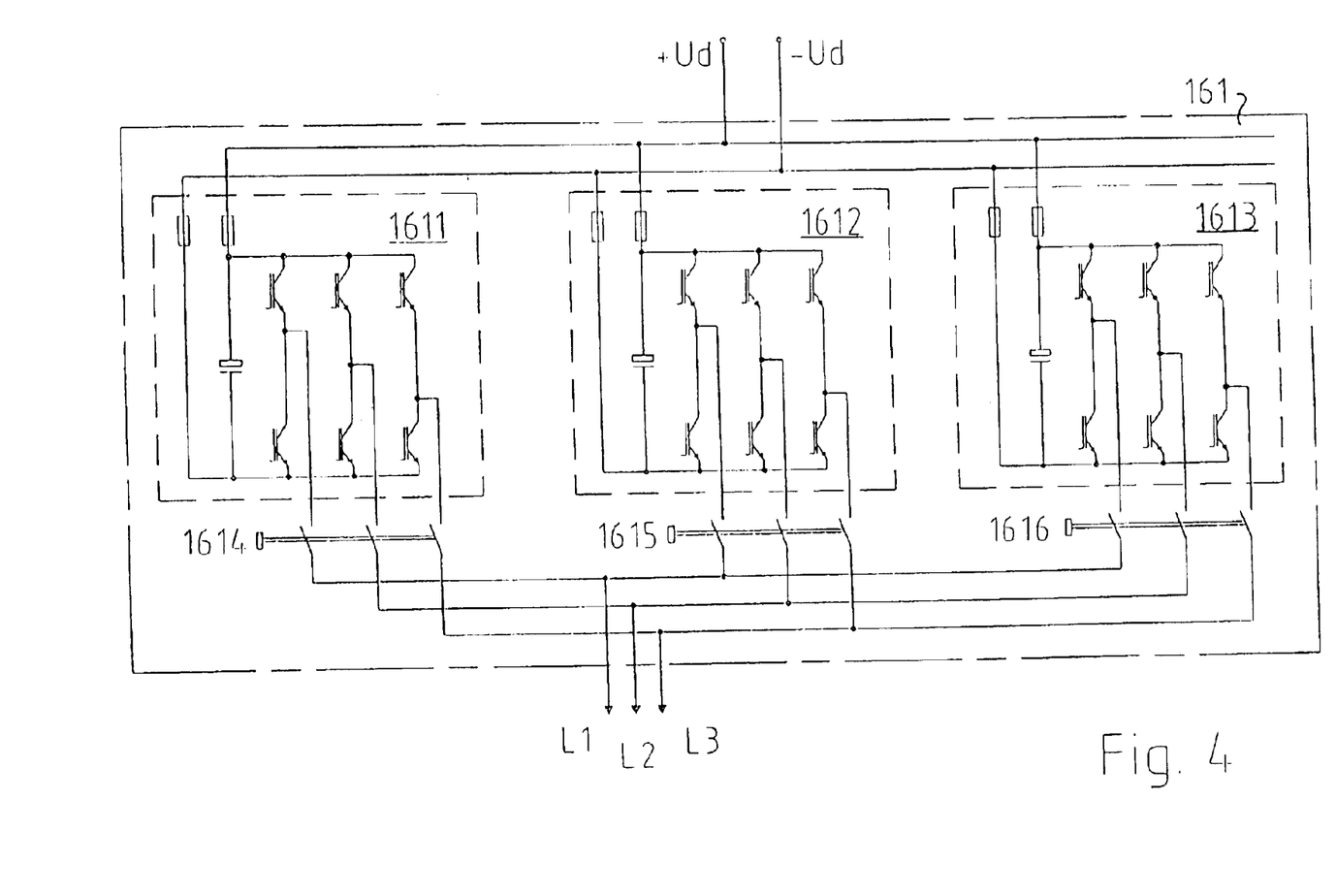
FIG. 4 shows an example of an inverter according to the invention.

A preferred embodiment of an inverter 161, 162, 163, 164 according to the invention is shown in FIG. 4. The provision of a plurality of inverters 161, 162, 163, 164 provides for external redundancy.

Taking the example of the inverter 161 whose structure is the same as the structure of the other inverters 162, 163, 164, FIG. 4 shows that it is made of three modules 1611, 1612, 1613 which embody internal resistance. The structure of the individual modules 1611, 1612, 1613 is the same with each other; in the present case they have IGBTs as switching elements which by suitable actuation produce the ac voltage from the applied dc voltage+Ud and−Ud. In addition the structure and the mode of operation of such modules are known from the state of the art and therefore a detailed description of the mode of operation will not be included here.

Each module 1611, 1612, 1613 produces a three-phase ac voltage from the applied dc voltage and can be connected by way of switches 1614, 1615, 1616 to the outputs L1, L2, L3 of the inverter 161.

The number of modules in an inverter 161, 162, 163, 164 however is not limited to three. It is equally possible to select a different number of modules 1611, 1612, 1613 and preferably a larger number in order to also embody a desired internal redundancy, besides the external redundancy.

The number of modules again makes it possible to implement over-dimensioning in order in this case also to obviate overloading and thus premature failure in the event of a fault in another inverter 161, 162, 163, 164.

Figure 5:
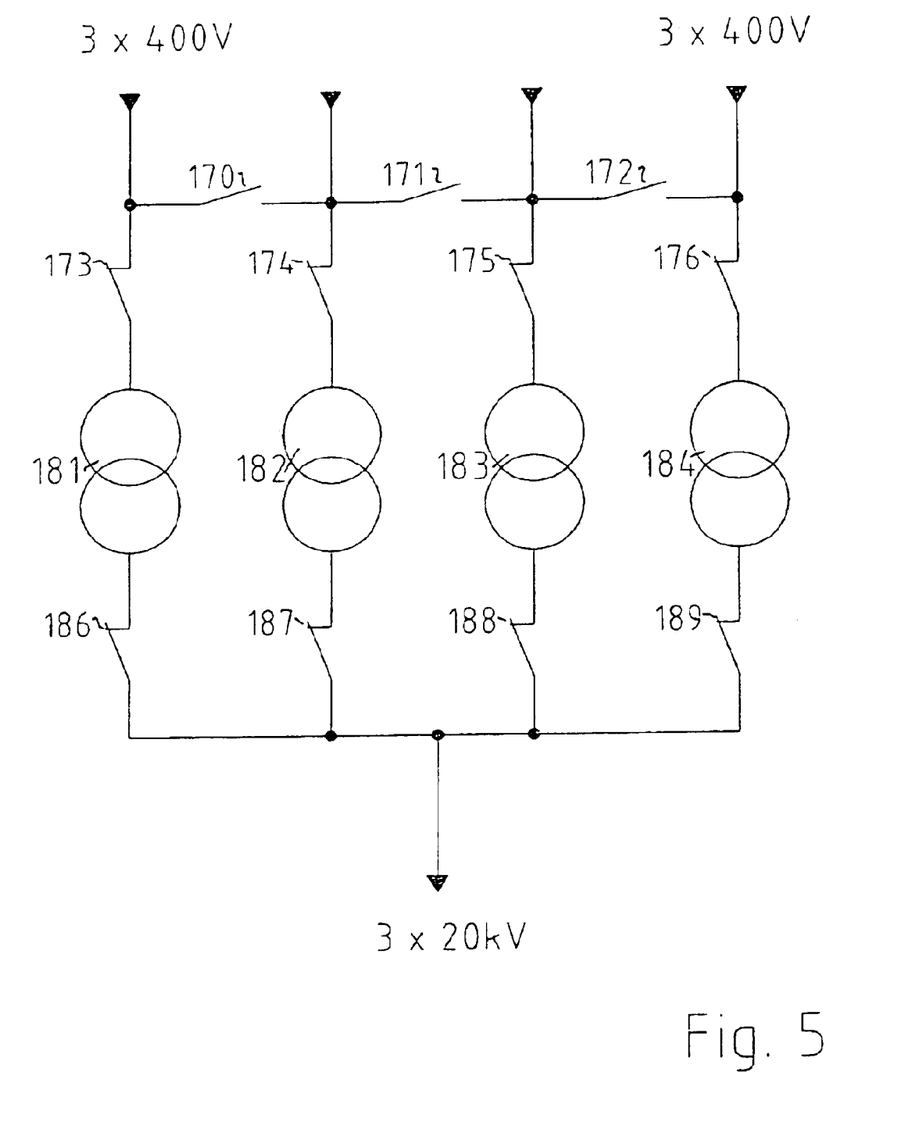
FIG. 5 shows an example of redundantly provided transformers having switch devices.

FIG. 5 shows a redundant arrangement of transformers 181, 182, 183, 184 which are preferably in the form of three-phase current transformers and which at the primary side are acted upon for example in each case with 3×400 V from the inverters 161, 162, 163, 164 and which on the secondary side deliver for example to a medium-voltage network an ac voltage which is transformed to for example 3×20 kV.

Those transformers 181, 182, 183, 184 are preferably also over-dimensioned in order to be able to operate reliably even after being subjected to the application of additional output power from a faulty or failed transformer 181, 182, 183, 184.

FIG. 5 once again shows the switch devices 170, 171, 172, 173, 174, 175, 176, 186, 187, 188, 189 which permit by-passing of a failed transformer 181, 182, 183, 184. In that case switch devices 173, 186; 174, 187; 175, 188; 176, 189 permit the primary and secondary windings of the failed transformers 181, 182, 183, 184 to be switched off in order in that way to avoid an impedance shift due to the parallel connection of the primary windings and/or the secondary windings of the transformers 181, 182, 183, 184 upon closure of the switch devices 170, 171, 172.

For that purpose the switch devices 173, 174, 175, 176 arranged at the primary side and the switch devices 186, 187, 188, 189 arranged at the secondary side are so designed that they galvanically separate all terminals of the corresponding transformer winding. In that respect control is preferably effected in such a way that both switch devices 173, 186; 174, 187; 175, 188; 176, 189 at a transformer 181, 182, 183, 184, that is to say for example the primary-side switch device 174 and the secondary-side switch device 187 at the transformer 182, are always simultaneously actuated in order reliably to disconnect the transformer 182.

Figure 6:
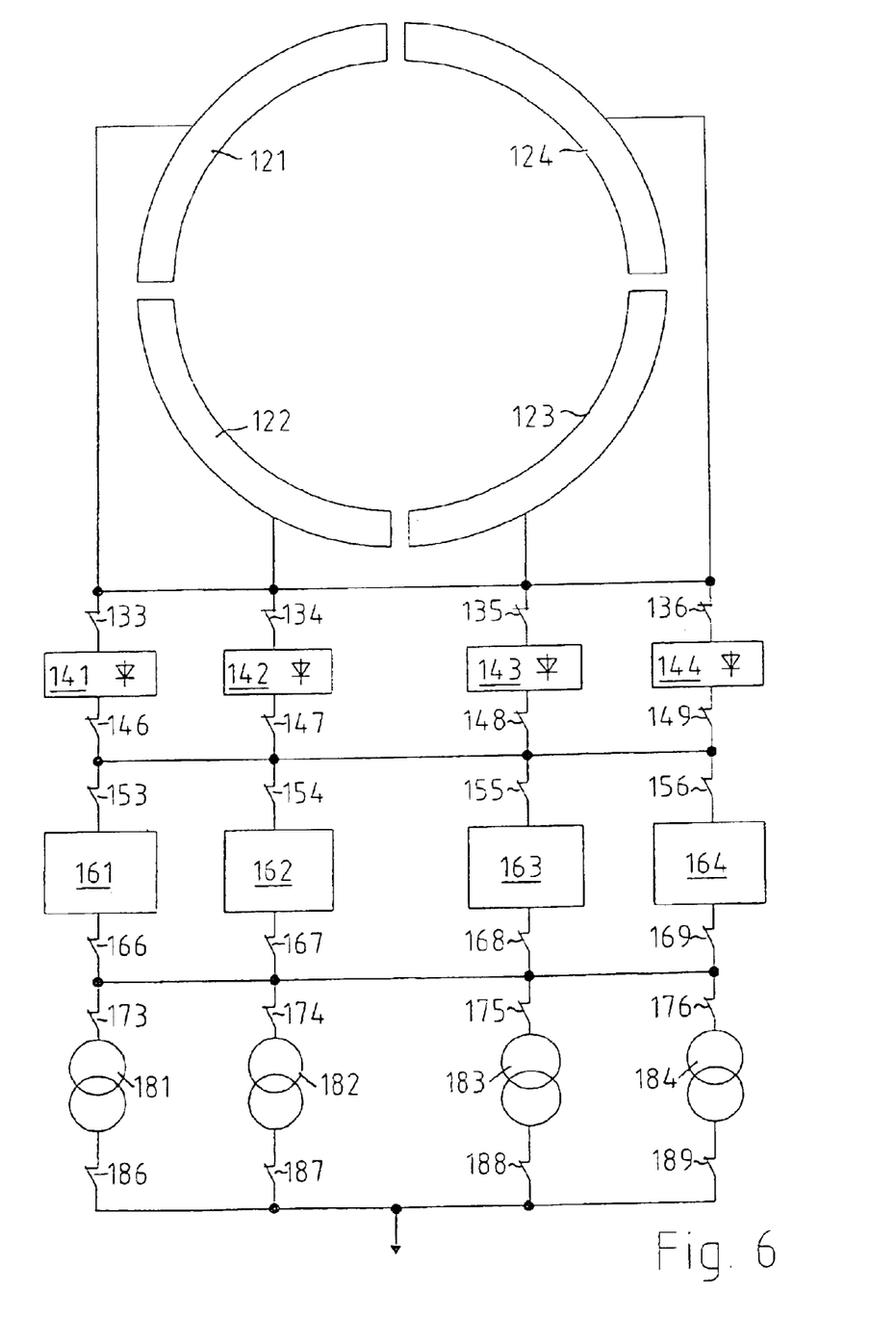
FIG. 6 shows a second embodiment of the present invention.

FIG. 6 shows a second embodiment of the present invention. This embodiment corresponds in large parts thereof to the embodiment shown in FIG. 2 and differs therefrom by virtue of the saving on the switch devices 130, 131, 132, 150, 151, 152, 170, 171, 172 in FIG. 2 between each two components, so that the similar components of the individual systems 101, 102, 103, 104 in FIG. 1 are connected in parallel and accordingly in normal operation are all acted upon by approximately a quarter of the output power produced.

In a manner corresponding to the arrangement in the first embodiment the switch devices 133, 134, 135, 136, 146, 147, 148, 149, 153, 154, 155, 156, 166, 167, 168, 169, 173, 174, 175, 176, 186, 187, 188, 189 are closed in normal operation so that all systems 101, 102, 103, 104 are operating.

If now a fault occurs at a component that component is disconnected by opening of the switch devices 133, 146; 134, 147; 135, 148; 136, 149; 153, 166; 154, 167; 155, 168; 156, 169; 173, 186; 174, 187; 175, 188; 176, 189 arranged in the feed line and the out line of the component in question, and the other components in the other systems 101, 102, 103, 104 (FIG. 1) are automatically acted upon with a higher level of output power.

Figure 7:
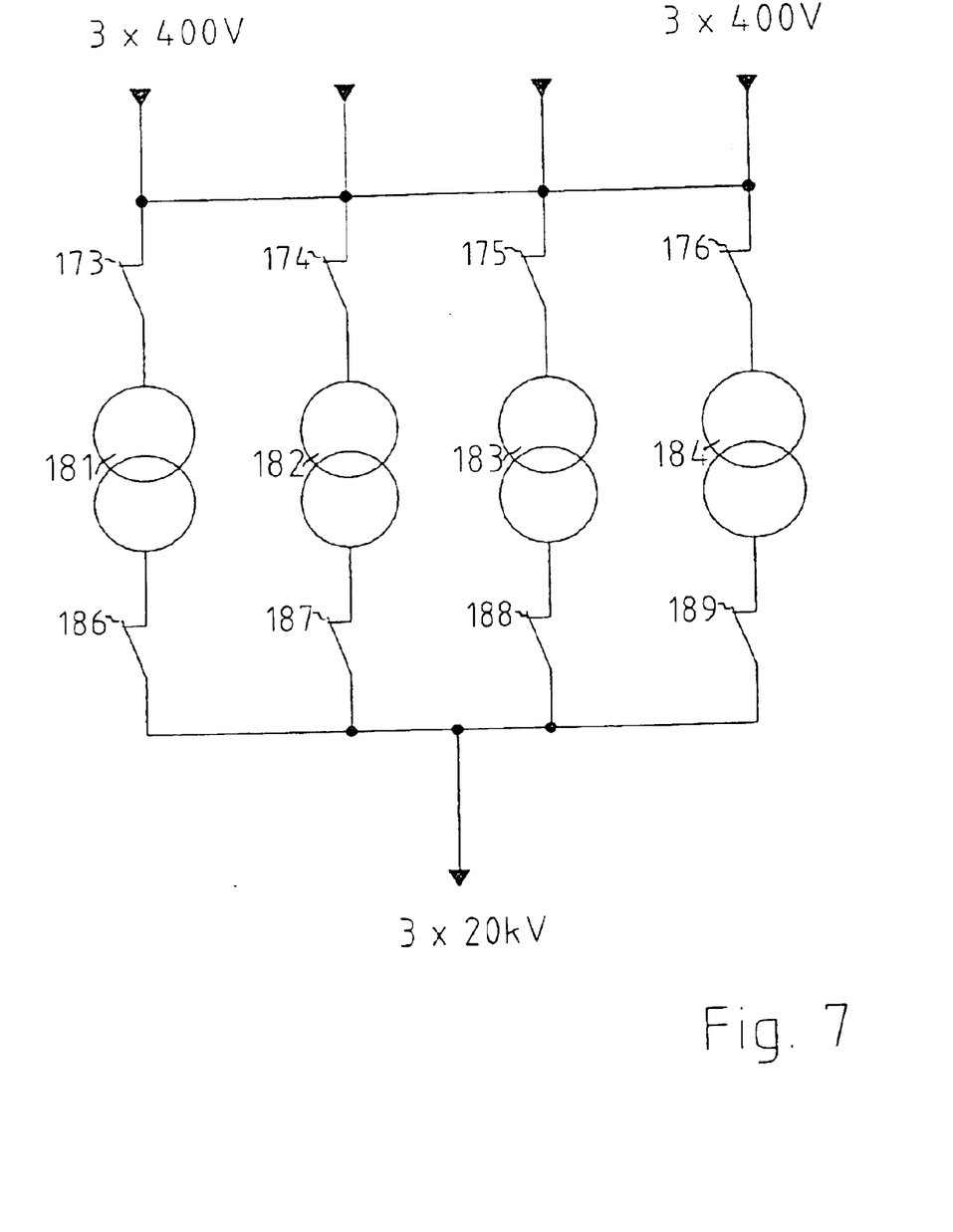
FIG. 7 shows an example of redundantly provided transformers in the second embodiment of the present invention.

This can also be clearly seen once again from FIG. 7 in which the transformers 181, 182, 183, 184 are connected in parallel by the normally closed switch devices 173, 174, 175, 176, 186, 187, 188, 189. If now a transformer 181, 182, 183, 184 is found to be defective or faulty the associated switch devices 173, 186; 174, 187; 175, 188; 176, 189 are actuated (opened) and the transformer in question is disconnected while the other transformers 181, 182, 183, 184 are respectively acted upon with a higher level of output power and the wind power installation still delivers all the energy produced.

Preferably the rectifiers 141, 142, 143, 144 shown by way of example in FIG. 1 are disposed in the machine housing, that is to say in the pod of the wind power installation. The inverters 161, 162, 163, 164 are preferably disposed in the base region of the pylon of a wind power installation and the inverters and the rectifiers are connected together by way of direct current bus bars 205, 206, 207, 208. The transformer for feeding the electrical output power produced into the network, in the case of an off-shore wind power installation, can also be disposed in the lowermost base region of a pylon of the wind power installation, that is to say below the water line.

What is claimed is:

1. A wind power installation comprising:
 a plurality of power generating systems arranged in parallel, including:
  a first power generating system with having a first stator and a first feed line configuration, wherein an output of the first stator is electrically connected to an input of the first feed line configuration, and wherein the first feed line configuration includes a first rectifier, a first inverter and a first transformer;
  a second cower generating system having a second stator and a second feed line configuration, wherein an output of the second stator is connected to an input of the second feed line configuration, and wherein the second feed line configuration includes a second rectifier, a second inverter and a second transformer; and
  wherein an output of the first transformer and an output of the second transformer couple to a power transmission line and, in combination, provide at least a portion of the output power of the wind cower installation.

2. The wind power installation of claim 1, wherein the first stator and the second stator are each shaped in the form of a segment of a circular ring in which a rotor is rotated, wherein the first and second stators, in combination, form a portion of the circular ring.

3. The wind power installation of claim 2, wherein at least the first stator comprises two windings.

4. The wind power installation of claim 2, wherein the first and second stators each comprises two windings.

5. The wind power installation of claim 4, wherein the two windings are electrically displaced relative to each other through 30°.

6. The wind power installation of claim 2, wherein at least the winding of the first stator comprises a three-phase current winding.

7. The wind power installation of claim 2, wherein the windings of the first and second stators comprises a three-phase current winding.

8. The wind power installation of claim 2, further including a switch device, electrically disposed between the output of the first stator and the input of the second feed line configuration, to connect the output of the first stator to the input of the second feed line configuration.

9. The wind power installation of claim 8, wherein the second rectifier is over-dimensioned relative to a nominal operating load.

10. The wind power installation of claim 2, further including a switch device to couple an output of the first rectifier to an input of the second inverter.

11. The wind power installation of claim 10, wherein the second inverter is over-dimensioned relative to a nominal operating load.

12. The wind power installation of claim 2, further including a plurality of switch devices to connect the output of the first stator to an input of the second transformer.

13. The wind power installation of claim 12, wherein the second transformer is over-dimensioned relative to a nominal operating load.

14. The wind power installation of claim 1, wherein:
a the first rectifier includes an input to receive a power signal from the first stator and an output to transmit a rectified power signal;
the first inverter includes an input to receive the rectified power signal from the first rectifier and an output to transmit an inverted power signal; and,
the first transformer includes an input to receive the inverted power signal from the first inverter and an output to transmit a transformed power signal onto the power transmission line;
the second rectifier includes an input to receive a power signal from the second stator and an output to transmit a rectified power signal;
the second inverter includes an input to receive the rectified power signal from the second rectifier and an output to transmit an inverted power signal; and,
the second transformer includes an input to receive the inverted power signal from the second inverter and an output to transmit a transformed power signal onto the power transmission line.

15. The wind power installation of claim 14, further comprising:
a first normally open switches disposed between the first and second feed line configurations at respective rectifier inputs.

16. The wind power installation of claim 15, further comprising:
a second normally open switch disposed between the first and second feed line configurations at respective inverter inputs.

17. The wind power installation of claim 16, further comprising:
a third normally open switch disposed between the first and second feed line configurations at respective transformer inputs.

18. The wind power installation of claim 17
wherein one or more of the first, second, or third normally open switches close in response to the failure of a rectifier, inverter, and/or transformer in one of the first and second feed line configurations.

19. The wind power installation of claim 18, further comprising:
a plurality of normally closed switches, including:
a first normally closed switch, disposed between the first stator and the first rectifier, to open in the event of a failure in the first rectifier;
a second normally closed switch, disposed between the first rectifier and the first inverter, to open in the event of a failure of the first inverter; and
a third normally closed switch, disposed between the first inverter and the first transformer, to open in the event of a failure of the first transformer;
a fourth normally closed switch, disposed between the second stator and the second rectifier, to open in the event of a failure in the second rectifier;
a fifth normally closed switch, disposed between the second rectifier and the second inverter, to open in the event of a failure in the second inverter; and
a sixth normally closed switch, disposed between the second inverter and the second transformer, to open in the event of a failure in the second transformer.

20. The wind power installation of claim 1 wherein the plurality of power generating systems further include:
a third power generating system having a third stator and a third feed line configuration, wherein an output of the third stator is electrically connected to an input of the third feed line configuration, and wherein the third feed line configuration includes a third rectifier, a third inverter and a third transformer; and
a fourth power generating system having a fourth stator and a fourth feed line configuration, wherein an output of the fourth stator is connected to an input of the fourth feed line configuration, and wherein the fourth feed line configuration includes a fourth rectifier, a fourth inverter and a fourth transformer
wherein the first transformer, the second transformer, the third transformer and the fourth transformer, in combination, provide the output power of the wind power installation.

21. The wind power installation of claim 20, wherein the first stator, the second stator, the third stator and the fourth stator are each shaped in the form of a segment of a circular ring wherein the first, second, third and fourth stators, in combination, substantially form the circular ring that is disposed around the rotatably mounted rotor.

22. A wind power installation comprising:
a plurality of power generating systems, including:
a first power generating system having a plurality of components including:
a stator configured as a first segment in a circular ring disposed around a rotatably mounted rotor, and
a feed line configuration to connect the stator with a power transmission line, wherein the feed line configuration includes a rectifier, an inverter, and a transformer; and
a second power generating system having a plurality of components including:
a stator configured as a second segment in the circular ring disposed around the rotatably mounted rotor, and
a feed line configuration to connect the stator of the second power generating system with the power transmission line, wherein the feed line configuration of the second power generating system includes a rectifier, an inverter, and a transformer.

23. The wind power installation of claim 22, further comprising:
a plurality of normally open switches disposed between the first and second power generating systems;
a first plurality of normally closed by-pass switch pairs connecting the rectifier, the inverter, and the transformer within the feed line configuration of the first power generating system; and
a second plurality of normally closed by-pass switch pairs connecting the rectifier, the inverter, and the transformer within the feed line configuration of the second power generating system.

24. The wind power installation of claim 23, wherein the plurality of normally open switches and the first and second plurality of normally closed by-pass switch pairs responsively switch to cut-out a component from its corresponding feed line configuration.

25. The wind power installation of claim 24, wherein the plurality of normally open switches further comprises:
a first normally open switch disposed between inputs of the rectifiers of the feed line configurations of the first and second power generating systems;
a second normally open switch disposed between inputs of the inverters of the feed line configurations of the first and second power generating systems; and
a third normally open switch disposed between inputs of the transformers of the feed line configurations of the first and second power generating systems.

26. The wind power installation of claim 22, wherein the stator of the feed line configuration of the first power generating system comprises two windings.

27. The wind power installation of claim 26, wherein the stators of the first and second power generating systems comprises two windings.

28. The wind power installation of claim 27, wherein the two windings are electrically displaced relative to each other through 30°.

29. The wind power installation of claim 22, wherein the winding of the stator of the first power generating system comprises a three-phase current winding.

30. The wind power installation of claim 22, wherein winding of the stators of the first and second power generating systems comprises a three-phase current winding.

31. The wind power installation of claim 22, wherein at least one rectifier in the feed line configuration of the first power generating system is sufficiently over-dimensioned relative to a nominal operating load to effectively power load share in the event of a component failure.

32. The wind power installation of claim 22, wherein at least one inverter in the feed line configuration of the first sower generating system is sufficiently over-dimensioned relative to a nominal operating load to effectively power load share in the event of a component failure.

33. The wind power installation of claim 22, wherein at least one transformer in the feed line configuration of the first power generating system is sufficiently over-dimensioned relative to a nominal operating load to effectively power load share in the event of a component failure.

34. The wind power installation of claim 22, wherein the plurality of power generating systems further includes a third power generating system having a plurality of components including:
a stator configured as a third segment in the circular ring that is disposed around the rotatably mounted rotor; and
a feed line configuration to connect the stator of the third power generating system with the power transmission line, wherein the feed line configuration of the third power generating system includes a rectifier, an inverter, and a transformer.

35. The wind power installation of claim 34 wherein the plurality of power generating systems are electrically cross-connected at selected points to by-pass a failure of one or more of the rectifiers, the inverters, and/or the transformers of the feed line configurations of the plurality of power generating systems.

36. The wind power installation of claim 34 wherein the plurality of power generating systems are electrically cross-connected via a switch network to by-pass a failure of one or more of the rectifiers, the inverters, and/or the transformers of the feed line configurations of the plurality of power generating systems.

37. The wind power installation of claim 34 wherein the plurality of power generating systems further includes a fourth power generating system having a plurality of components including:
a stator configured as a fourth segment in the circular ring disposed around the rotatably mounted rotor; and
a feed line configuration to connect the stator of the fourth power generating system with the power transmission line, wherein the feed line configuration of the fourth power generating system includes a rectifier, an inverter, and a transformer.

38. The wind power installation of claim 37 wherein the plurality of power generating systems are electrically cross-connected at selected points to by-pass a failure of one or more of the rectifiers, the inverters, and/or the transformers of the feed line configurations of the plurality of power generating systems.

39. A wind power installation comprising:
a plurality of power generating systems, each power generating system including:
a stator, and
a feed line configuration to connect the stator with a power transmission line, wherein the feed line configuration includes components that comprise a rectifier, an inverter, and a transformer;
wherein the plurality of power generating systems are electrically cross-connected at selected points to by-pass a failure of one or more of the rectifiers, the inverters, and/or the transformers.

40. The wind power installation of claim 39, further comprising:
a plurality of normally closed by-pass switch pairs connecting each component within a respective feed line configuration.

41. The wind power installation of claim 40, wherein the plurality of power generating systems are electrically cross-connected at the respective points selected from a group of cross-connection points consisting of:
inputs to respective rectifiers in the plurality of power generating systems,
inputs to respective inverters in the plurality of power generating systems,
inputs to respective transformer in the plurality of power generating systems, and,
output to respective transformer in the plurality of power generating systems.

42. The wind power installation of claim 39 wherein the stator of each power generating system is an independent segment of a circular ring that is disposed around a rotatably mounted rotor wherein the stators of the plurality of power generating systems, in combination, substantially form the circular ring.

* * * * *

UNITED STATES PATENT AND TRADEMARK OFFICE
CERTIFICATE OF CORRECTION

PATENT NO.         : 6,946,750 B2
APPLICATION NO. : 10/344481
DATED                 : September 20, 2005
INVENTOR(S)       : Wobben It is certified that error appears in the above-identified patent and that said Letters Patent is hereby corrected as shown below:

In col. 8, on line 48, delete "with".

In col. 8, on line 54, delete "cower" and substitute --power--.

In col. 8, on line 64, delete "cower" and substitute --power--.

In col. 9, on line 57, delete "switches" and substitute --switch--.

In col. 11, on line 53, delete "sower" and substitute --power--.

Signed and Sealed this

Sixth Day of February, 2007

JON W. DUDAS
*Director of the United States Patent and Trademark Office*